(No Model.)

D. W. FRENCH.
PIPE CUTTER.

No. 492,579. Patented Feb. 28, 1893.

Witnesses
W. H. Courtland
Theodore Bourne

Inventor
David W. French
by T. F. Bourne
his attorney.

UNITED STATES PATENT OFFICE.

DAVID WILLIS FRENCH, OF UNION HILL, NEW JERSEY.

PIPE-CUTTER.

SPECIFICATION forming part of Letters Patent No. 492,579, dated February 28, 1893.

Application filed March 8, 1892. Serial No. 424,170. (No model.)

*To all whom it may concern:*

Be it known that I, DAVID WILLIS FRENCH, a citizen of the United States, and a resident of Union Hill, in the county of Hudson and State of New Jersey, have invented certain new and useful Improvements in Pipe-Cutters, of which the following is a specification.

The object of my invention is to provide a pipe or bar cutter that can be operated effectively and with comparative ease, and wherein a pipe that is under ground can be readily cut without removing it.

The invention consists in a frame that can be firmly mounted on a pipe, combined with a rotary cutter carried by said frame, and means to actuate said cutter.

The invention also consists in the novel details of improvement and the combinations of parts that will be more fully hereinafter set forth and then pointed out in the claims.

Figure 1:
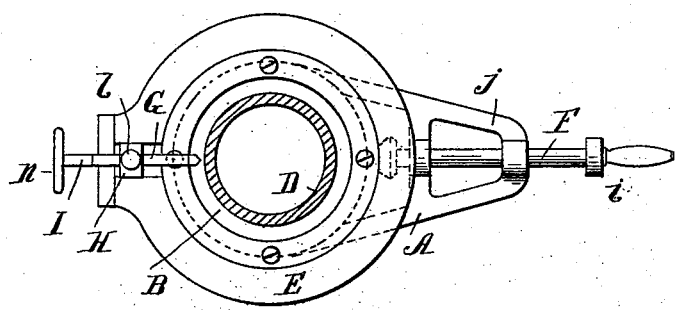
Figure 2:
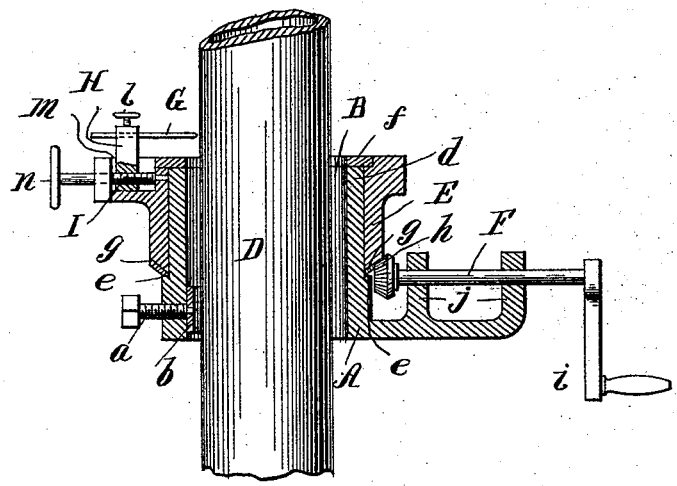
Figure 3:
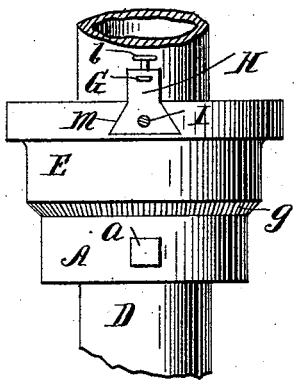
Figure 4:
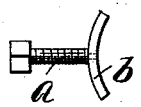

Reference is to be had to the accompanying drawings forming part hereof, wherein, Figure 1, is a front elevation of my improved pipe cutter shown mounted on a pipe, the latter being in section. Fig. 2, is a longitudinal section thereof. Fig. 3, is a side elevation, looking from the left in Fig. 1, and Fig. 4, is a detail view of a clamp to hold the cutter upon the pipe.

In the accompanying drawings the letter A indicates a frame or the like having a base B, through which a pipe or bar D, can be passed, whereby the frame A can be mounted on the pipe. The frame A, can be held firmly and rigidly upon the pipe D, by set screws $a$, and in order to assist in holding the frame A firmly on the pipe D, I may attach to the inner ends of the set screws $a$, plates or clamps $b$, to engage the pipe D, the inner faces of said plates $b$, being preferably curved as shown in Fig. 4. The outer side of the frame A, at one part $d$, is made circular to receive a rotary cutter-carrier or tube E having an inner bore to travel on the circular part $d$ of the frame A, (see Fig. 2.) The frame A, has a stop or off-set $e$, preferably circular, against which the cutter carrier E abuts at one end, and on one end of the frame A, is screwed or clamped a ring or plate $f$, that extends over the outer end of the cutter-carrier E, and preferably countersunk therein, as shown, whereby the cutter-carrier E, is caused to travel evenly around on the frame A. On the cutter-carrier E, is a circular set of cog teeth $g$, that mesh with a gear $h$, shown driven by a shaft F, whereby as the shaft F is turned the cutter-carrier E, will be rotated around the frame A, and pipe D. A crank $i$ is shown carried by the shaft F for turning it. The shaft F, is shown journaled in bearings $j$, on the frame A.

G, is the cutter or knife for cutting the pipe, and it is shown carried by a head or block H, and longitudinally adjustable therein by means of a set screw $l$. The head or block H, is supported on the cutter-carrier E, and is adjustable laterally thereon or toward and from the pipe D, so as to feed the cutter G to the pipe as the latter is cut. For this purpose the head or block G, is guided in a groove $m$ in the cutter-carrier E.

I is a screw that passes into or through the head or block H, working in threads therein, said screw being journaled to rotate in suitable bearings carried by the cutter-carrier E, as shown. By means of a hand wheel $n$, the screw I can be turned to feed the head or block H, and thereby the cutter G toward or from the pipe D.

To use my improvement the pipe to be cut is passed through the base B, of the frame A, and the latter is clamped rigidly upon the pipe by the set screws $a$, there being as many used as desired. The cutter G is then fed up to the pipe and the shaft F turned, whereupon the cutter-carrier E, will be rotated around the pipe, and the cutter can be fed to the work as desired. A practically continuous cutting of the pipe can thus be effected whereby time can be saved, and great power can be applied to the cutter.

It will be understood that the means for turning the cutter-carrier can be changed as desired without departing from the spirit of my invention.

One great advantage of my device is that a pipe that is already in the ground can be readily cut by merely making a sufficient excavation around it to enable the screw I, to travel around while the shaft F can extend above. By this means a great saving can be effected in making repairs, &c.

My device is simple, compact and cheap to manufacture.

Having now described my invention, what I claim is—

1. A pipe or bar cutter, composed of a frame cast in a single piece of metal with a central bore to receive a pipe, a cutter-carrier made in a single piece of metal with a bore to receive said frame and revolubly carried thereby, a plate or ring $f$, carried by the frame to retain the cutter carrier thereon, a cutter connected with said cutter carrier, and means substantially as described for rotating said cutter carrier, substantially as described.

2. A pipe cutter, composed of a frame having a circular part $d$ a cutter-carrier mounted on the part $d$, an off-set $e$ on said frame, a detachable ring or plate $f$, on the end of the frame, a cutter on the cutter-carrier, and a means substantially as described for turning said cutter-carrier, substantially as specified.

Signed at Union Hill, in the county of Hudson and State of New Jersey, this 5th day of March, A. D. 1892.

DAVID WILLIS FRENCH.

Witnesses:
J. H. GREEN,
M. C. McCROSKERY.